Feb. 14, 1933.    R. AMBRONN    1,897,688
METHOD OF AND APPARATUS FOR ELECTRIC EARTH EXPLORATION

Filed March 13, 1929    2 Sheets-Sheet 1

Inventor:
Richard Ambronn,
By Byrnes, Townsend + Brickenstein,
Attorneys.

Feb. 14, 1933. R. AMBRONN 1,897,688
METHOD OF AND APPARATUS FOR ELECTRIC EARTH EXPLORATION
Filed March 13, 1929    2 Sheets-Sheet 2
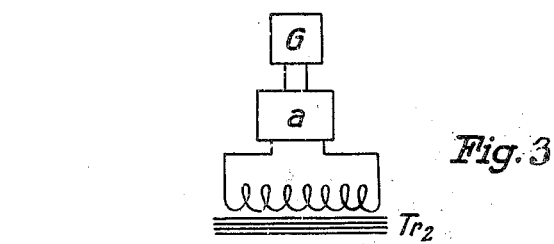
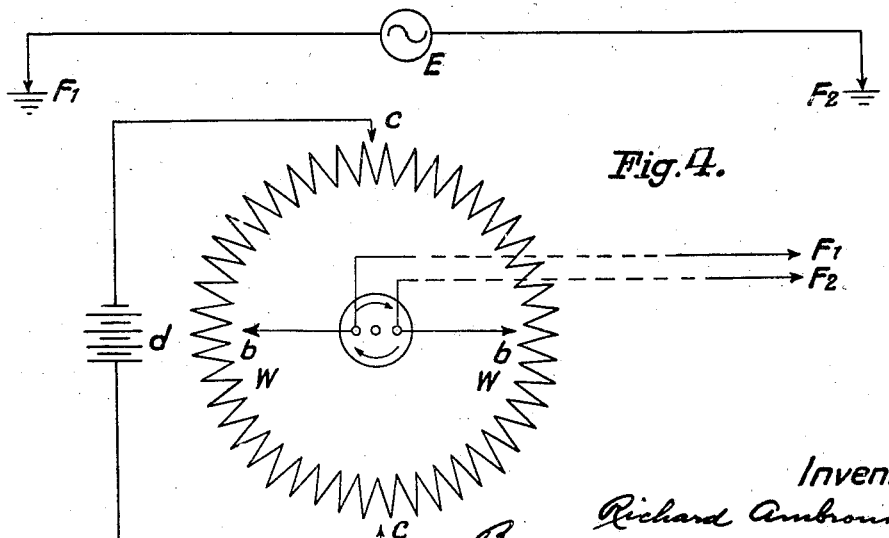

Patented Feb. 14, 1933

1,897,688

UNITED STATES PATENT OFFICE

RICHARD AMBRONN, OF GOTTINGEN, GERMANY

METHOD OF AND APPARATUS FOR ELECTRIC EARTH EXPLORATION

Application filed March 13, 1929, Serial No. 346,768, and in Germany March 20, 1928.

In electrically exploring the ground with a view to ascertain if and where it contains valuable materials such as ore or oil or salt, it is usual to feed the ground with alternating current of medium or high frequency, because in this way it is possible to clearly distinguish the results produced by the said alternating current from the natural currents occurring in the earth.

Now, the feeding of the ground with alternating current of a medium or high frequency results in the formation of an elliptically polarized magnetic field, whereby the measurements to be made in the course of the exploration and the interpretation of the results are made extremely difficult.

My invention has for its object to overcome the said difficulties and with this object in view I employ alternating currents of a very low frequency for producing the current field in the earth or ground and for measuring the same I make use of apparatus, such as galvanometers, having oscillating members with a frequency of oscillation in conformity with the frequency of the current applied for feeding the earth or ground. Alternating currents of a low frequency, say of the order .3 to 10 periods per second, generate an electromagnetic field whereof the elliptic polarization is so low as to be entirely negligible. Accordingly the employment of a current of very low frequency involves and entails the advantageous possibility of using measuring instruments of less complicated construction requiring only to be tuned to the transmitter frequency in order to exclude from observation the natural earth currents of alternating character present in the ground. For experience teaches that natural currents of a low frequency such as used in accordance with the present invention are never set up in the earth.

I will now proceed to describe my invention more in detail in connection with certain embodiments thereof illustrated somewhat diagrammatically on the accompanying drawings forming a part of this specification.

Fig. 3 is a further modification, and Figure 4 is a diagrammatic illustration of an arrangement for generating low frequency alternating current of substantially sinusoidal wave-line.

Figure 1:
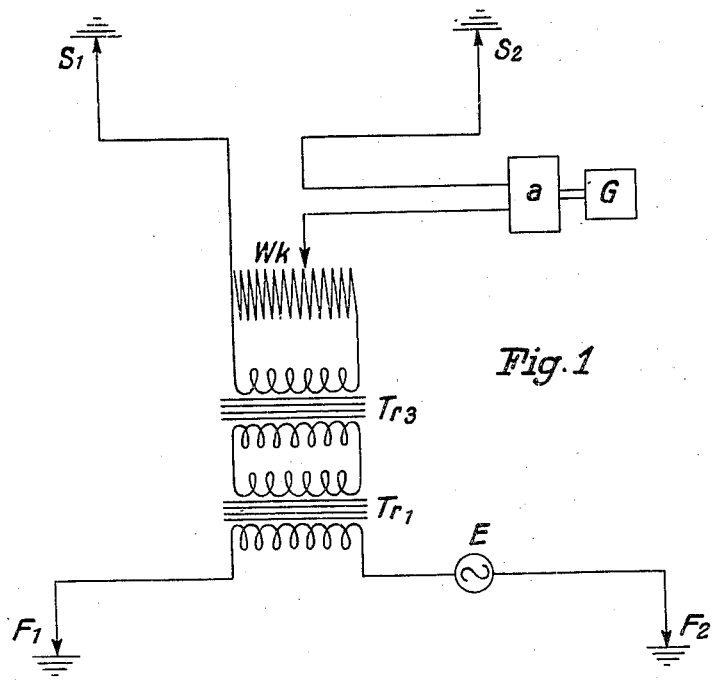
Figure 1 is a wiring diagram for an arrangement allowing field measuring without current flow from the field under observation at the measuring operation.

Referring to the embodiment shown in Figure 1 the reference-letter E indicates an alternating current generator included in a current conductor the two extremities or terminals $F_1$ and $F_2$ of which are grounded. The said conductor also includes the primary of a transformer $Tr1$ whereof the secondary is connected to the primary of a second transformer $Tr3$ whose secondary is closed across a measuring resistance $Wk$.

The receiving circuit comprises two seeking electrodes $S_1$ and $S_2$, an amplifier $a$ and a measuring instrument $G$ such as a galvanometer or the like whose natural vibration is tuned to the frequency of the transmitted current. The described receiving circuit is connected to the measuring resistance $Wk$ in such a manner that any part of the latter can be put in the receiving circuit.

The operation of the described wiring connection is as follows. The current discharged by the alternating current generator E into the ground produces in the latter a field having a phase similar to or coinciding with that of the exciting current. Part of the supplied current will be transmitted by the two transformers $Tr1$ and $Tr3$ to the measuring resistance $Wk$. As in each of the two transformers the phase of the current is changed by 90 degrees, the phase of the current in the measuring resistance W$k$ will be displaced by 180 degrees with relation to that of the current supplied by the generator. S$_1$ and S$_2$ are test electrodes acting to take up the tension prevailing in the earth at the places where the test electrodes are inserted and to conduct the same across the measuring apparatus including the members $a$ and G, to the measuring resistance W$k$. By changing or varying the portion of the measuring resistance included in the circuit of the test electrodes the current in the apparatus $a$ G can be made to disappear totally.

The superposition of energy branched from the primary current on the one hand and of energy taken from the field to be measured on the other hand allow the advantages of so-called "null" methods to be made use of.

Referring now to the modification shown in Figure 2 the same is mainly distinguished from the embodiment described with reference to Figure 1 by that the superposition of the energy branched from the primary circuit and the energy abstracted or derived at the place of observation, from the field to be measured takes places in a superposition transformer comprising, besides the windings P conducting the primary energy and the windings S conducting the secondary energy, a third winding or coil Z with the measuring apparatus attached thereto and in turn comprising, as before, the members $a$ and G.

Figure 2:
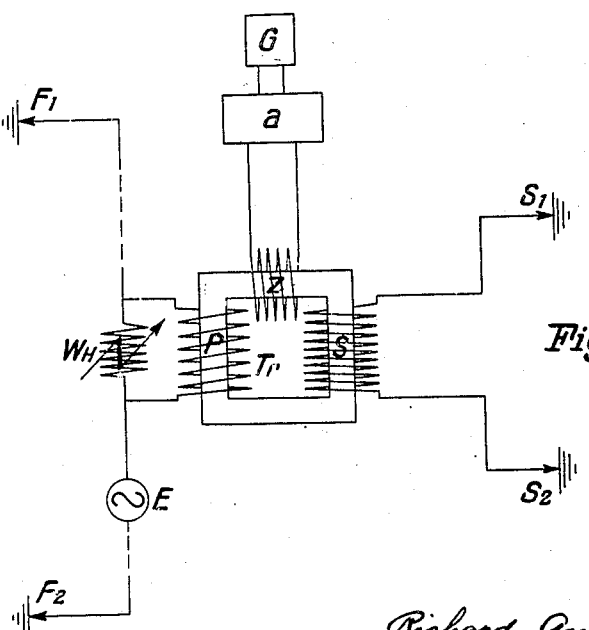
Figure 2 is a modification thereof allowing likewise observation according to a zero method without however avoiding current flow from the field under observation.

In Figure 2 the earth connections of the alternating current generator E are likewise designated by F$_1$ and F$_2$ and the test electrodes in the observation space are indicated by S$_1$ and S$_2$ just as in Figure 1. W$h$ is an adjusting device for the current exciting coil P, its purpose being to preferably adjust said current in such manner that the effect of coil S on coil Z is counterbalanced by that of coil P so as to leave the measuring instrument in zero position.

It will be seen that the chief difference existing between the two arrangements shown in Figure 1 and Figure 2 respectively, resides in that in Figure 2 energy is constantly abstracted, absorbed or derived from the observation space.

In the modification shown in Figure 3 the supply circuit is effected by means of a generator E having earth connections F$_1$ and F$_2$, while the receiving circuit is equipped with test electrodes S$_1$ and S$_2$ interconnected by a conductor including the primary of a transformer T$r$2 whereof the secondary is attached to the measuring apparatus comprising an amplifier $a$ and a measuring instrument G as described hereinbefore. In the wiring connecting the two test electrodes S$_1$ and S$_2$ there is a resistance W$s$ provided for the purpose of reducing as far as possibly can be done, the abstraction and derivation of energy from the ground in the sound circuit.

In this modification the transformer T$r$2 will act to separate or filter off the natural earth currents of direct character and keep the same out of the way or remote from the measuring apparatus comprising the amplifier $a$ and the instrument G.

In order to ensure the effect aimed at it is of importance that the state of vibration of the alternating current of low frequency transmitted into the ground, be of a substantially sinusoidal form. As ordinary alternating current generators necessarily must be given large dimensions in case of frequencies of the order employed according to the present invention, it is advisable to provide particular means for the generation of alternating currents of that character. A suitable arrangement for the purpose is shown, by way of example, diagrammatically in Figure 4. In this instance alternating current is obtained from a source $d$ of direct current, a pair of brushes $bb$ being provided and disposed to run around over an annular resistance coil W connected at two diametrically opposite points $c$ with the two poles of the source $d$ of direct current. Thus it will be seen that an approximately sine-shaped alternating current is caused to flow through the brushes $b$ and the field electrodes F$_1$ and F$_2$ to the earth, the frequency of the current depending upon the revolving speed of the brushes.

I am aware of the fact that it has been proposed to control the depth of penetration of electric waves by choice of the frequency of the current which is supplied to the ground under exploration, but the range of frequencies contemplated by the present invention is determined by other considerations. This is evident from the fact that substantially no change in the ease or depth of penetration is noted for changes in frequency below the value of about 100 cycles. According to the present invention, the limits of the preferred range of frequencies are determined by the maximum frequency of the natural ground currents and by the frequency which must not be exceeded if a field free from elliptical polarization is to be established.

What I claim is:—

1. The method of electric earth exploration which comprises generating an alternating current within the range of very low frequencies that has a minimum value equal to the maximum frequency of natural earth currents and has a maximum value equal to the minimum frequency effective to produce elliptical polarization, transmitting said alternating current of very low frequency into the earth by means of a circuit comprising electrodes embedded in the ground at two spaced points, and observing the effect of said current in the earth by means of an electrical measuring instrument tuned to the low frequency of said current.

2. In electrical exploration of the ground, the process which comprises establishing between two spaced points in the ground an alternating electric field substantially free from elliptical polarization and of a frequency higher than that of natural earth currents, connecting between another pair of spaced points in the ground a test circuit including a measuring instrument, and determining the magnitude of the alternating current flow in said test circuit by comparing the alternating current established in said measuring instrument by said test circuit with a second alternating current transferred from said source to said instrument.

3. A method of electric earth exploration which comprises transmitting an alternating current of a very low frequency into the earth or ground, branching off an adjustable portion of the transmitted current, superposing the said current portion with electromagnetic energy derived at the place of observation from the ground charged with the current, and observing or determining the current effect resulting from said superposition, by means of an electrical measuring instrument tuned to the said low frequency.

4. A method of electric earth exploration which comprises transmitting an alternating current of a very low frequency into the earth or ground, branching off an adjustable portion of the transmitted current, superposing the said current portion with electromagnetic energy derived at the place of observation from the ground charged with the current, balancing the superposed energies until they neutralize each other, and observing or ascertaining the resultant of the two superposed energies by means of a measuring instrument tuned to the frequency of the transmitted current.

5. A method of electric earth exploration which comprises transmitting an alternating current of a very low frequency into the earth or ground, branching off an adjustable portion of the transmitted current, abstracting or recovering electromagnetic energy from the ground charged with the said low frequency alternating current, superposing the said energy over the current portion branched off from the transmitted current, and measuring the result of said superposition in the circuit fed by the ground charged with current.

6. Arrangement for use in electric earth exploration comprising a generator for the production of alternating current of a very low frequency, conductors for conducting the produced low frequency alternating current to the ground, means for branching off an adjustable portion of the primary current employed for charging the ground therewith, means for abstracting or recovering electromagnetic energy from a ground charged with the current and for superposing the same onto the said adjustable branched off current portion, and an instrument for observing or measuring the resulting current, the said instrument being included in the circuit in which the superposition takes place, and tuned to the low frequency of the current transmitted into the ground.

In testimony whereof, I affix my signature.
RICHARD AMBRONN.